US007875338B2

(12) United States Patent
Souparis

(10) Patent No.: US 7,875,338 B2
(45) Date of Patent: Jan. 25, 2011

(54) SECURITY PROTECTION OF DOCUMENTS OR PRODUCTS BY AFFIXING AN OPTICALLY ACTIVE COMPONENT FOR VERIFICATION OF AUTHENTICITY

(75) Inventor: Hugues Souparis, Nogent sur Marne (FR)

(73) Assignee: Hologram Industries (S.A.) (FR)

( * ) Notice: Subject to any disclaimer, the term of this patent is extended or adjusted under 35 U.S.C. 154(b) by 0 days.

(21) Appl. No.: 10/145,320

(22) Filed: May 14, 2002

(65) Prior Publication Data

US 2002/0164456 A1 Nov. 7, 2002

Related U.S. Application Data

(63) Continuation of application No. PCT/FR00/03201, filed on Nov. 17, 2000.

(30) Foreign Application Priority Data

Nov. 19, 1999 (FR) .................................. 99 14601

(51) Int. Cl.

*B32B 3/00* (2006.01)
*B32B 7/00* (2006.01)
*B32B 15/00* (2006.01)
*G03C 3/00* (2006.01)
*G03H 1/00* (2006.01)
*G02B 5/18* (2006.01)

(52) U.S. Cl. ....................... 428/172; 428/913; 428/916; 428/209; 428/203; 359/2; 359/567; 430/1; 430/10

(58) Field of Classification Search ................. 428/172, 428/207, 209, 915, 913, 203, 41.8, 29, 916; 283/86, 91, 72, 107, 94, 904, 85; 359/2, 359/567; 264/1.31, 1.34; 430/1, 2, 10; 355/2
See application file for complete search history.

(56) References Cited

U.S. PATENT DOCUMENTS 3,338,730 A * 8/1967 Slade et al. ................. 428/142

(Continued)

FOREIGN PATENT DOCUMENTS

CA 2300971 A1 2/1999

(Continued)

OTHER PUBLICATIONS

Souparis, Hugues "Combined Machine-Readable and Visual Authenticable Optical Devices" *SPIE*, Feb. 1-2, 1996, vol. 2659, p. 152-157.

(Continued)

*Primary Examiner*—David R Sample
*Assistant Examiner*—Catherine Simone
(74) *Attorney, Agent, or Firm*—DLA Piper LLP (US)

(57) ABSTRACT

A component for authenticating a document or a product including a plastic film having at least one embossed surface, a metallization layer at least partially covering the embossed surface, the film and the metallized layer forming an embossed film having a first zone producing a rainbow effect according to a first orientation of the component in relation to a lighting direction, the rainbow effect disappearing when the component is oriented substantially perpendicularly to the first orientation, and a second zone which has been partially demetallized and remetallized with a dielectric material producing an effect of being colored by a first color for the first orientation of the component and by a second different color for the orientation substantially perpendicular to the first orientation.

8 Claims, 3 Drawing Sheets

U.S. PATENT DOCUMENTS

| | | | | | |
|---|---|---|---|---|---|
| 4,579,754 | A | | 4/1986 | Maurer et al. | |
| 4,662,653 | A | | 5/1987 | Greenaway | 283/91 |
| 4,856,857 | A | * | 8/1989 | Takeuchi et al. | 359/3 |
| 4,892,385 | A | * | 1/1990 | Webster et al. | 359/572 |
| 5,319,475 | A | * | 6/1994 | Kay et al. | 359/2 |
| 5,383,687 | A | * | 1/1995 | Suess et al. | 283/86 |
| 5,492,370 | A | * | 2/1996 | Chatwin et al. | 283/110 |
| 5,513,019 | A | * | 4/1996 | Cueli | 359/2 |
| 5,516,153 | A | | 5/1996 | Kaule | 283/85 |
| 5,549,953 | A | | 8/1996 | Li | 428/64.1 |
| 5,714,231 | A | * | 2/1998 | Reinhart | 428/156 |
| 5,801,857 | A | | 9/1998 | Heckenkamp et al. | |
| 5,857,709 | A | | 1/1999 | Chock | |
| 6,066,378 | A | | 5/2000 | Morii et al. | |
| 6,127,066 | A | | 10/2000 | Ueda et al. | |
| 6,234,537 | B1 | | 5/2001 | Gutmann et al. | |
| 6,328,342 | B1 | | 12/2001 | Belousov et al. | |
| 6,337,752 | B1 | | 1/2002 | Heckenkamp et al. | |
| 6,428,051 | B1 | | 8/2002 | Herrmann et al. | 283/107 |
| 6,471,247 | B1 | | 10/2002 | Hardwick et al. | |
| 6,706,354 | B1 | | 3/2004 | Otaki et al. | |
| 6,747,768 | B1 | | 6/2004 | Knocke et al. | |
| 6,750,472 | B2 | | 6/2004 | Suzuki et al. | |
| 6,786,513 | B1 | | 9/2004 | Cobben et al. | |
| 2002/0191234 | A1 | | 12/2002 | Ishimoto et al. | |
| 2003/0048635 | A1 | | 3/2003 | Knoerzer et al. | |
| 2003/0129345 | A1 | | 7/2003 | Morii et al. | |
| 2003/0155495 | A1 | | 8/2003 | Drinkwater | |
| 2003/0170471 | A1 | | 9/2003 | Seto et al. | |
| 2003/0174373 | A1 | | 9/2003 | Drinkwater | |
| 2005/0116048 | A1 | | 6/2005 | Sauter et al. | |

FOREIGN PATENT DOCUMENTS

| | | | | |
|---|---|---|---|---|
| CA | 2 247 974 | | | 5/1999 |
| DE | 4334847 | A1 | | 4/1995 |
| EP | 0 304 194 | A2 | | 2/1989 |
| EP | 0531605 | | | 3/1993 |
| EP | 1 266 768 | A2 | | 12/2002 |
| EP | 1 431 062 | A1 | | 12/2002 |
| GB | 2136352 | A | * | 9/1984 |
| JP | 2003-248414 | A | | 9/2003 |
| WO | 95/21747 | A1 | | 8/1995 |
| WO | 95/27925 | | | 10/1995 |
| WO | 97/18092 | A1 | | 5/1997 |
| WO | WO 9947983 | A1 | * | 9/1999 |
| WO | 03/057502 | A1 | | 7/2003 |
| WO | 03/061983 | A1 | | 7/2003 |
| WO | 03/062900 | A1 | | 7/2003 |
| WO | 03/098188 | A2 | | 11/2003 |
| WO | 03/098280 | A2 | | 11/2003 |
| WO | 01/00418 | A1 | | 1/2004 |
| WO | 2004/009373 | A1 | | 1/2004 |
| WO | 2004/011274 | A1 | | 2/2004 |
| WO | 2006/002552 | A1 | | 1/2006 |
| WO | 2006/021102 | A1 | | 3/2006 |
| WO | 2006/074558 | A1 | | 7/2006 |

OTHER PUBLICATIONS van Renesse, Rudolf L. "Optical Document Security" 2nd Ed., Artech House, Boston, 1998, Chapter 10, p. 225-245; Chapter 12, p. 267-287; Chapter 15, p. 349-385.

Kiy, M. et al., "Patterned Polymer LEDs by a Screen-Printing Method," *CSEM Scientific and Technical Report*, 2003, p. 49.

Westenhofer, S. et al., "Micro-Optics for Flexible OLED Illuminators," *CSEM Scientific and Technical Report*, 2003, p. 40.

* cited by examiner

SECURITY PROTECTION OF DOCUMENTS OR PRODUCTS BY AFFIXING AN OPTICALLY ACTIVE COMPONENT FOR VERIFICATION OF AUTHENTICITY

RELATED APPLICATION

This is a continuation of International Application No. PCT/FR00/03201, with an international filing date of Nov. 17, 2000, which is based on French Patent Application No. 99/14601, filed Nov. 19, 1999.

FIELD OF THE INVENTION

This invention relates to document or product security protection by affixing an optically active component for verification of authenticity.

BACKGROUND

Known in the prior art are various authentication means employing diffracting components, especially holographic components. These components are difficult to imitate and, thus. make the forgery task more difficult for the would-be forger.

The optical effects produced by the authentication means of the prior art consist generally of animations whose conformity is not always easy to verify. Moreover, these animations are produced under very specific lighting and observation conditions, and the uninformed user can encounter uncertainties in the verification consisting of checking whether the animation observed, often with difficulty because of the object being checked or poor lighting conditions, corresponds to the animation specified for an authentic object.

It would, therefore, be advantageous to resolve this drawback by providing an optical component that enables easy, unambiguous verification while simultaneously providing great resistance to forgery.

SUMMARY OF THE INVENTION

This invention relates to a component for authenticating a document or a product including a plastic film having at least one embossed surface, a metallization layer at least partially covering the embossed surface, the film and the metallized layer forming an embossed film having a first zone producing a rainbow effect according to a first orientation of the component in relation to a lighting direction, the rainbow effect disappearing when the component is oriented substantially perpendicularly to the first orientation, and a second zone which has been partially demetallized and remetallized with a dielectric material producing an effect of being colored by a first color for the first orientation of the component and by a second different color for the orientation substantially perpendicular to the first orientation.

This invention also relates to a process for preparing a component for authenticating a document or a product including embossing at least a portion of a plastic film, metallizing at least a portion of the embossed plastic film, at least partially demetallizing the embossed film, and depositing a dielectric material in demetallized portions of the embossed film.

This invention still further relates to a security protected document including a substrate, and an optical component including an embossed film, wherein the embossed film has 1) a first metallized zone producing a rainbow effect according to a first orientation of the component in relation to a lighting direction, the rainbow effect disappearing when the component is oriented substantially perpendicularly to the first orientation, and 2) a second zone producing an effect of being colored by a first color for the first orientation of the component and by a second different color for the orientation substantially perpendicular to the first orientation.

BRIEF DESCRIPTION OF THE DRAWINGS

Better comprehension of the invention will be obtained from the description below with reference to a nonlimitative example of implementation in which.

DETAILED DESCRIPTION

Figure 1:
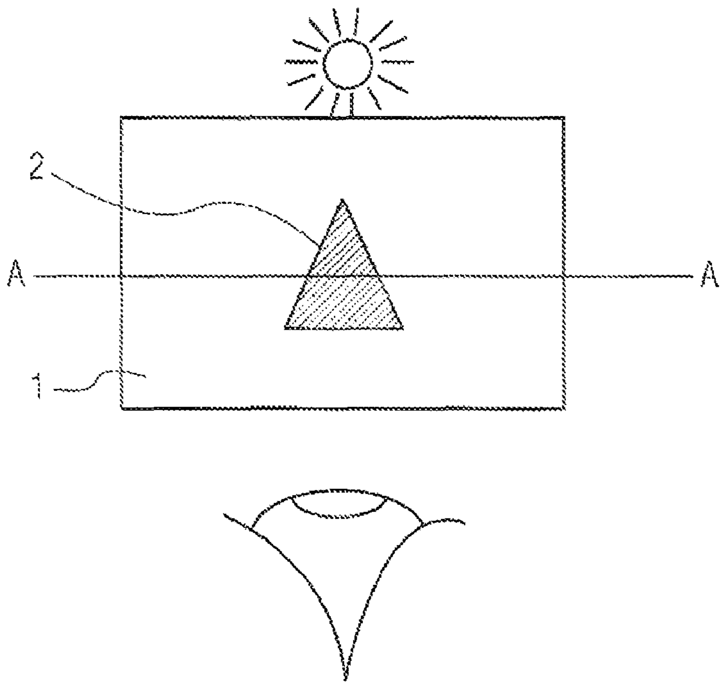
FIG. 1 represents a view of a component according to a first orientation.

It will be appreciated that the following description is intended to refer to specific embodiments of the invention selected for illustration in the drawings and is not intended to define or limit the invention, other than in the appended claims.

The invention concerns in its most general sense a component for authenticating a document or a product which has a transparent plastic film embossed with at least one diffraction grating, with the embossed surface being at least partially covered by a metallization layer, characterized in that the embossed film has a first metallized zone producing a rainbow effect according to a first orientation of the component in relation to a lighting direction, the rainbow effect disappearing when the component is oriented substantially perpendicularly to the first orientation, and a second zone which has been demetallized, then coated with a high optical index dielectric material producing an effect of being colored by a first color for a first orientation of the component and by a second different color for the orientation substantially perpendicular to the first orientation.

Each of these two zones has recognizable information.

Advantageously, the first direction corresponds to an orientation in which the observer and the lighting sources are in a plane substantially perpendicular to the surface of the component.

The second zone is a zone having a deposit of a high-index dielectric material.

The invention also concerns a process for preparation of a component for authentication of a document or product, characterized in that the process comprises a step involving stamping on a substantially transparent film, a step involving metallizing the stamped film, a step involving partial demetallization of the stamped film prepared in this manner and a step involving deposition of a dielectric material.

The process preferably comprises a supplementary coating step.

According to one particular variant, the demetallization step is implemented by masking parts of the first zone with a varnish or the like, then passing the component prepared in this manner through a chemical bath. Other demetallization methods known in the state of the art are also applicable.

Figure 2:
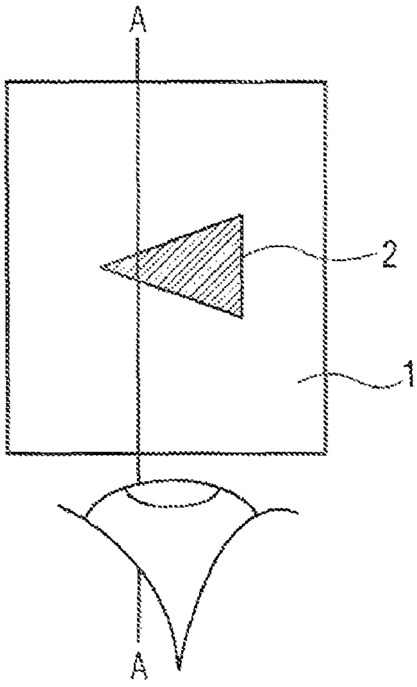
FIG. 2 represents a view of the component in a second orientation.

Turning to the drawings, FIGS. 1 and 2 represent views according to a first orientation of the component (straight-on observation) and according to a second orientation of the component (observation at 90°). First peripheral zone 1 has a metallic appearance with an easily verifiable rainbow effect. The central zone 2 has a uniform color, for example, blue.

When the component is turned by ninety degrees as represented in FIG. 2, it takes on a very different appearance. The peripheral zone 1 loses its rainbow effect and takes on a nondiffracting matt appearance. The central zone 2 undergoes a very clear color change, for example, turning to red. These effects are very pronounced and do not leave the verifier with any uncertainty.

Figure 3:
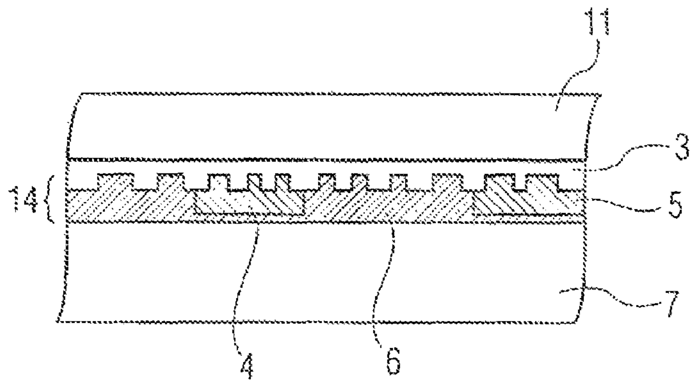
FIG. 3 represents a cross-sectional view taken along the line A-A of the component.

FIG. 3 represents a view along a sectional plane A-A. The component is formed by a polyester film 11 embossed by stamping in a known manner for the creation of holograms or diffractive structures intended for the authentication of documents. The polyester film 11 is coated with stamping coating 3, which is covered, preferably by vacuum-deposition, with a metallization layer 14. The metallization layer 14 is, for example, aluminum.

Figure 7:
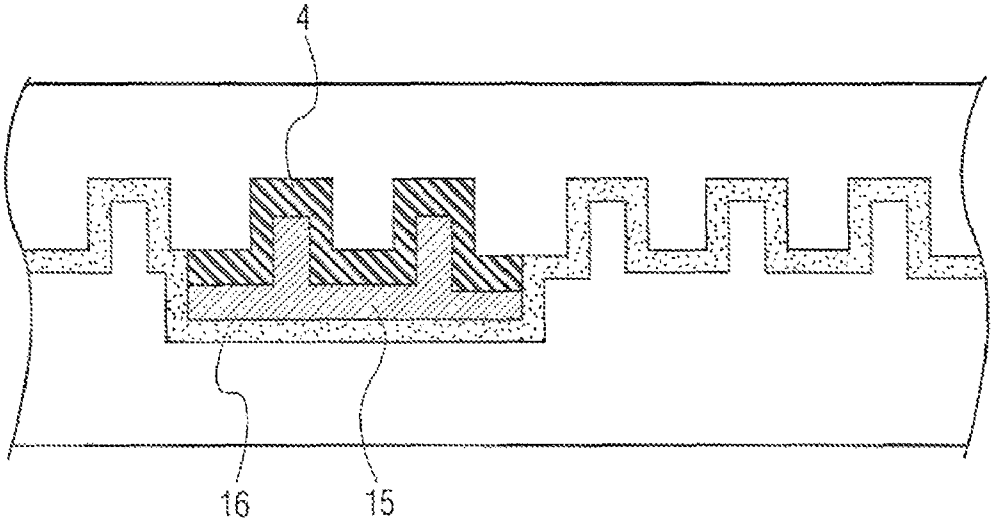
FIG. 7 is an exploded view of a portion of the component shown in FIG. 3.

As shown in FIGS. 3 and 7, this metallization layer 14 is partially suppressed such that only the peripheral zone remains, manifested by the metallized parts 4 and 5 and the demetallized part 6.

The demetallized part 6 corresponding to the variable coloration zone 2 is demetallized by a process comprised of masking the metallized surface, except for the zone to be demetallized, with a protective coating such as varnish 15. The component is then immersed in a bath that destroys the metallization layer 14 in the areas that are not protected by the protective coating 15.

After stripping these sites, another vacuum deposition step is performed. However, this step is not performed with a metallic material, but rather with a transparent dielectric material 16 with a high optical index, for example, zinc sulfide (ZnS).

The assembly prepared in this manner is then coated with an adhesive film 7 deposited, for example, by coating.

The component created in this manner can be affixed on a document or product to be protected, for example, by gluing.

It can also be sealed between an object or a document and a sealing film protecting the object or document and enabling detection of any attempt to remove this film.

Figure 4:
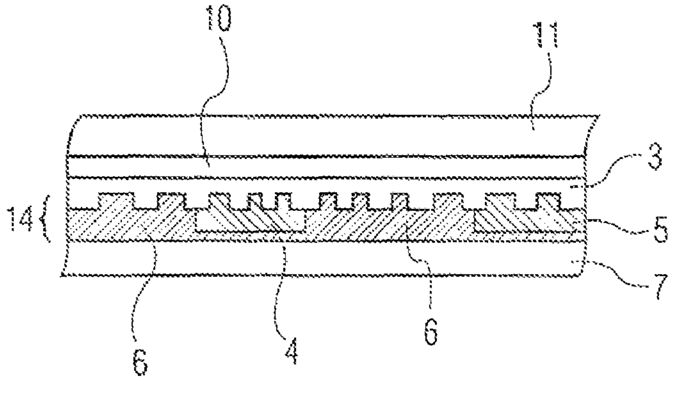
FIG. 4 represents a cross-sectional view of a variant of implementation for creation of a hot-printing film or a lamination film.

FIG. 4 represents a variant of implementation for the creation of a hot-printing or lamination film. The stamping varnish 3 is applied on a detachment layer 10 which is itself supported on a transparent film 11, for example, a polyester film. An adhesive layer may be coated onto the metallization layer 14.

Figure 5:
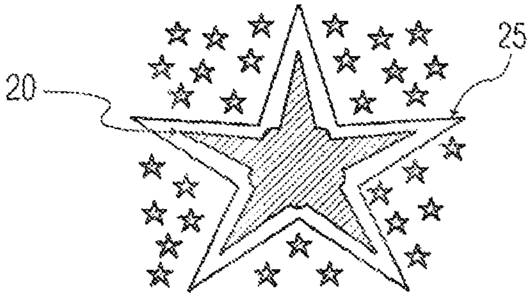
FIGS. 5 and 6 schematically show variants of implementation of an optical component according to the invention.
Figure 6:
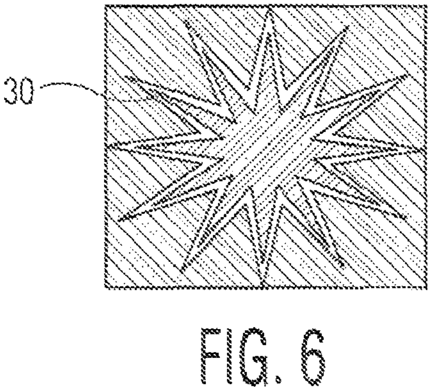

FIGS. 5 and 6 represent variants of implementation of an optical component according to the invention. In these examples of implementation, zones 20, 30 shown as black can be constituted either by the metallized zone or by the zone which has been demetallized and coated with a dielectric.

The component can furthermore have a microlettering line 25.

The invention claimed is:

1. A component for authenticating a document or a product comprising:

a plastic film having an embossed surface with at least one diffraction grating and an opposed surface, a varnish coated metal layer comprising a metal layer having a first surface contacting the diffraction grating and an opposite, second surface contacting a varnish protective layer, the plastic film and the varnish coated metal layer forming an embossed film defining a plane wherein a metalized rainbow effect zone comprises the embossed surface and the varnish coated metal layer, said varnish coated metal layer at least partially covering the embossed surface and containing demetallized portions lacking the varnish coated metal layer, the metalized rainbow effect zone producing a rainbow effect according to a first orientation of the component in relation to a lighting direction, said rainbow effect disappearing and having a non-diffracting matte appearance when the component is rotated within the plane such that it is oriented substantially perpendicularly to the first orientation, a demetallized colored effect zone coated with a transparent dielectric material layer in the demetallized portions present in the varnish coated metal layer on the diffraction grating and at least partially covering the embossed surface, said demetallized colored effect zone having a high optical index and, in combination with the diffraction grating, producing an effect of being colored by a first color for the first orientation of the component and by a second different color when the component is rotated within the plane such that it is oriented substantially perpendicularly to the first orientation, said transparent dielectric material layer also covering the varnish coated metal layer, and wherein the component enables easy and unambiguous verification between the effects of the metalized rainbow effect zone and the demetallized colored effect zone according to a first orientation of the component in relation to a lighting direction and when the component is rotated within the plane such that it is oriented substantially perpendicularly to the first orientation.

2. The component according to claim 1, wherein the rainbow effect zone is a peripheral surface surrounding the colored effect zone, with each of the zones containing recognizable information.

3. The component according to claim 1, wherein the first orientation corresponds to an orientation in which an observer and the lighting source are in a plane substantially perpendicular to a surface component.

4. The component according to claim 2, wherein the first orientation corresponds to an orientation in which an observer and the lighting source are in a plane substantially perpendicular to a surface of the component.

5. The component according to claim 1, wherein the plastic film is stamping varnish and is covered by an adhesive on the opposed surface layer.

6. The component according to claim 1, wherein the plastic film is covered by a detachment layer on the opposed surface and the detachment layer is covered by a transparent film.

7. The component according to claim 1, wherein the dielectric material is ZnS.

8. A component for authenticating a document or a product comprising:

a plastic film having an embossed surface formed by stamping with at least one diffraction grating, a varnish coated metal layer applied to the embossed surface and comprising a metalized rainbow effect zone, said rainbow effect zone comprising a first area wherein the embossed surface is covered by the varnish coated metal layer and that is adjacent to a demetallized colored effect zone comprising a second area in the varnish coated metal layer applied to the embossed surface lacking the varnish coated metal layer, and wherein the embossed surface in said second area is coated with a transparent dielectric material having a high optical index, said transparent dielectric material layer also covering the varnish coated metal layer, the plastic film and the varnish coated metal layer forming an embossed film defining a plane, wherein the metalized rainbow effect zone comprises the embossed surface and the varnish coated metal layer, said varnish coated metal layer at least partially covering the embossed surface, the metalized rainbow effect zone produces a rainbow effect according to a first orientation of the component in relation to a lighting direction and the rainbow effect disappears and the metalized rainbow effect zone has a non-diffracting matte appearance when the component is rotated within the plane such that it is oriented substantially perpendicularly to the first orientation, the demetallized colored effect zone at least partially covers the embossed surface, the demetallized colored effect zone in combination with the diffraction grating, producing an effect of being colored by a first color for the first orientation of the component and by a second different color when the component is rotated within the plane such that it is oriented substantially perpendicularly to the first orientation, and the component enables easy and unambiguous verification between the effects of the metalized rainbow effect zone and the demetallized colored effect zone according to a first orientation of the component in relation to a lighting direction and when the component is rotated within the plane such that it is oriented substantially perpendicularly to the first orientation.

* * * * *